United States Patent
Hong

(10) Patent No.: US 11,910,422 B2
(45) Date of Patent: Feb. 20, 2024

(54) METHODS AND APPARATUSES FOR SELF-INTERFERENCE PROCESSING

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 425 days.

(21) Appl. No.: 17/289,886

(22) PCT Filed: Oct. 30, 2018

(86) PCT No.: PCT/CN2018/112665
§ 371 (c)(1),
(2) Date: Apr. 29, 2021

(87) PCT Pub. No.: WO2020/087272
PCT Pub. Date: May 7, 2020

(65) Prior Publication Data
US 2021/0410150 A1    Dec. 30, 2021

(51) Int. Cl.
*H04W 72/541* (2023.01)
*H04W 72/21* (2023.01)
(Continued)

(52) U.S. Cl.
CPC ......... *H04W 72/541* (2023.01); *H04W 72/21* (2023.01); *H04W 72/23* (2023.01); *H04W 72/51* (2023.01)

(58) Field of Classification Search
CPC . H04W 36/30; H04W 36/305; H04W 52/146; H04W 52/241; H04W 52/243;
(Continued)

(56) References Cited

U.S. PATENT DOCUMENTS 10,574,366 B2 * 2/2020 Lee .......................... H04L 5/14
2007/0010226 A1 * 1/2007 Laroia ................. H04L 27/2647
455/701
(Continued)

FOREIGN PATENT DOCUMENTS

CN         102421103 A     4/2012
CN         104219695 A    12/2014
(Continued)

OTHER PUBLICATIONS

First Office Action and Search Report issued in Chinese Application No. 201880002291.4 dated Mar. 31, 2021 with English translation, (18p).
(Continued)

*Primary Examiner* — Joseph Arevalo
(74) *Attorney, Agent, or Firm* — Arch & Lake LLP

(57) ABSTRACT

The present disclosure provides a method and apparatus for self-interference processing. The method being applied to a base station, and including: determining that a terminal has a self-interference processing capability, wherein the self-interference processing capability is achieved through an autonomous denial functionality; configuring a first autonomous denial parameter for achieving the self-interference processing capability for the terminal; and sending the first autonomous denial parameter to the terminal, so that the terminal performs a corresponding self-interference processing according to the first autonomous denial parameter.

16 Claims, 9 Drawing Sheets

(51) Int. Cl.
*H04W 72/23* (2023.01)
*H04W 72/51* (2023.01)

(58) Field of Classification Search
CPC . H04W 52/247; H04W 52/386; H04W 52/44; H04W 72/21; H04W 72/541; H04W 76/19; H04W 88/08
USPC .................................. 370/336, 331, 329, 230
See application file for complete search history.

(56) References Cited

U.S. PATENT DOCUMENTS

| | | | |
|---|---|---|---|
| 2007/0253372 A1* | 11/2007 | Nakayasu | H04W 52/243 455/63.1 |
| 2012/0250526 A1* | 10/2012 | Zhao | H04B 7/15557 370/293 |
| 2014/0092761 A1 | 4/2014 | Behravan et al. | |
| 2014/0126437 A1* | 5/2014 | Patil | H04L 25/03343 370/310 |
| 2015/0063145 A1 | 3/2015 | Jactat et al. | |
| 2015/0195848 A1 | 7/2015 | Hong et al. | |
| 2015/0201449 A1 | 7/2015 | Jung et al. | |
| 2015/0382364 A1 | 12/2015 | Sharma | |
| 2016/0205581 A1 | 7/2016 | Lee et al. | |
| 2018/0213538 A1* | 7/2018 | Na | H04W 72/21 |
| 2021/0258100 A1* | 8/2021 | Hassan Hussein | H04W 72/0453 |
| 2022/0077913 A1* | 3/2022 | Horn | H04B 7/088 |
| 2022/0191827 A1* | 6/2022 | Balasubramanian | H04W 72/02 |
| 2022/0225454 A1* | 7/2022 | Lim | H04W 24/10 |

FOREIGN PATENT DOCUMENTS

| | | |
|---|---|---|
| CN | 104756578 A | 7/2015 |
| CN | 104756597 A | 7/2015 |
| CN | 104956734 A | 9/2015 |
| CN | 106688298 A | 5/2017 |
| CN | 107466486 A | 12/2017 |
| CN | 108401537 A | 8/2018 |
| WO | 2013100658 A1 | 7/2013 |
| WO | 2014054890 A2 | 4/2014 |

OTHER PUBLICATIONS

International Search Report issued in PCT Application No. PCT/CN2018/112665 dated Jul. 25, 2019 with English translation, (4p).
State Intellectual Property Office of the People's Republic of China, Office Action and Search Report Issued in Application No. 201880002291.4, dated Oct. 18, 2021, 19 pages. (Submitted with Machine Translation).
Nokia, Nokia Shanghai Bell, "Discussion on LAA/Wifi coexistence", 3GPP TSG-RAN WG2 #101, R2-1802745, Athens, Greece, Feb. 26-Mar. 2, 2018, 5 pages.
Huawei, HiSilicon, "Discussions on the In-Device Co-existence for EN-DC", 3GPP TSG-RAN WG4 Meeting AH-1801, R4-1802595, Athens, Greece, Feb. 26-Mar. 2, 2018, 3 pages.
ISA State Intellectual Property Office of the People's Republic of China, Written Opinion of the International Searching Authority Issued in Application No. PCT/CN2018/112665, dated Jul. 25, 2019, WIPO, 9 pages.

* cited by examiner

METHODS AND APPARATUSES FOR SELF-INTERFERENCE PROCESSING

CROSS REFERENCE TO RELATED APPLICATIONS

This application is the national phase application of International Application No. PCT/CN2018/112665, filed on Oct. 30, 2018, the entire contents of which are incorporated herein by reference for all purposes.

TECHNICAL FIELD

The present disclosure relates to the field of communication technology, and in particular to methods and apparatuses for self-interference processing.

BACKGROUND

In a new generation communication network, that is, the fifth generation mobile communication technology (referred to as 5th Generation, 5G for short) network, because a 5G terminal device needs to support relatively more radio access technologies (RAT for short) and frequency bands, the 5G terminal device may face more serious interference within the device (i.e. self-interference). However, there is no optimized solution to process self-interference in the related art.

SUMMARY

In order to overcome the problems existing in the related art, examples of the present disclosure provide methods and apparatuses for self-interference processing.

According to a first aspect of the examples of the present disclosure, there is provided a method for self-interference processing, the method being applied to a base station, and including:

determining that a terminal has a self-interference processing capability, wherein the self-interference processing capability is achieved through an autonomous denial functionality;

configuring a first autonomous denial parameter for achieving the self-interference processing capability for the terminal; and sending the first autonomous denial parameter to the terminal, so that the terminal performs a corresponding self-interference processing according to the first autonomous denial parameter.

Optionally, determining that the terminal has the self-interference processing capability includes:

receiving radio access capability report information sent by the terminal, wherein the radio access capability report information includes first information for indicating that the terminal has the self-interference processing capability; and determining that the terminal has the self-interference processing capability, according to the first information.

Optionally, receiving the radio access capability report information sent by the terminal includes:

receiving a transmitted first radio resource control (RRC) signaling, wherein the first RRC signaling includes the radio access capability report information; and acquiring the radio access capability report information from the first RRC signaling.

Optionally, the first autonomous denial parameter includes at least one of:

a number of subframes designated for autonomous denial;
time designated for autonomous denial; or
a carrier designated for autonomous denial.

Optionally, sending the first autonomous denial parameter to the terminal includes:

adding the first autonomous denial parameter to a second RRC signaling; and sending the second RRC signaling to the terminal, so that the terminal acquires the first autonomous denial parameter from the second RRC signaling.

Optionally, the method further includes:

receiving a second autonomous denial parameter sent by the terminal, wherein the second autonomous denial parameter is a parameter for achieving the self-interference processing capability recommended by the terminal;

if it is chosen, according to the second autonomous denial parameter, to adjust the first autonomous denial parameter, obtaining an adjusted third autonomous denial parameter by adjusting the first autonomous denial parameter according to the second autonomous denial parameter; and sending the third autonomous denial parameter to the terminal, so that the terminal stops performing the self-interference processing according to the first autonomous denial parameter, but performs the self-interference processing according to the third autonomous denial parameter.

Optionally, the third autonomous denial parameter is the same as the second autonomous denial parameter; or the third autonomous denial parameter is different from the first autonomous denial parameter and the second autonomous denial parameters.

Optionally, the method further includes:

If it is chosen, according to the second autonomous denial parameter, not to adjust the first autonomous denial parameter, generating a specific notification signaling, wherein the specific notification signaling is configured to indicate in an explicit way that the base station chooses not to adjust the first autonomous denial parameter; and sending the specific notification signaling to the terminal, so that the terminal determines that the base station chooses not to adjust the first autonomous denial parameter, according to the specific notification signaling.

According to a second aspect of the examples of the present disclosure, there is provided a method for self-interference processing, the method being applied to a terminal, and including:

receiving a first autonomous denial parameter sent by a base station, wherein the first autonomous denial parameter is a parameter for achieving a self-interference processing capability of the terminal, which is configured by the base station for the terminal after the base station determines that the terminal has the self-interference processing capability achieved through an autonomous denial functionality; and performing the self-interference processing according to the first autonomous denial parameter.

Optionally, the method further includes:

when determining that the terminal has the self-interference processing capability, generating first information for indicating that the terminal has the self-interference processing capability;

adding the first information to radio access capability report information; and sending the radio access capability report information to the base station, so that the base station determines that the terminal has the self-interference processing capability according to the first information in the radio access capability report information.

Optionally, sending the radio access capability report information to the base station includes:
adding the radio access capability report information to a first radio resource control (RRC) signaling; and
sending the first RRC signaling to the base station, so that the base station acquires the radio access capability report information from the first RRC signaling.

Optionally, the first autonomous denial parameter includes at least one of:
a number of subframes designated for autonomous denial;
time designated for autonomous denial; or
a carrier designated for autonomous denial.

Optionally, receiving the first autonomous denial parameter sent by the base station includes:
receiving a transmitted second RRC signaling, wherein the second RRC signaling includes the first autonomous denial parameter; and
acquiring the first autonomous denial parameter from the second RRC signaling.

Optionally, the method further includes:
determining a second autonomous denial parameter, wherein the second autonomous denial parameter is a parameter for achieving the self-interference processing capability recommended by the terminal;
sending the second autonomous denial parameter to the base station, so that the base station chooses, according to the second autonomous denial parameter, to adjust the first autonomous denial parameter or not to adjust the first autonomous denial parameter; and
if a third autonomous denial parameter sent by the base station is received, stopping performing the self-interference processing according to the first autonomous denial parameter, but performing the self-interference processing according to the third autonomous denial parameter, wherein the third autonomous denial parameter is an autonomous denial parameter obtained by adjusting the first autonomous denial parameter according to the second autonomous denial parameter by the base station.

Optionally, the method further includes:
if a specific notification signaling sent by the base station is received, wherein the specific notification signaling is configured to indicate in an explicit way that the base station chooses not to adjust the first autonomous denial parameter, continuing to perform the self-interference processing according to the first autonomous denial parameter.

Optionally, the method further includes:
starting a specific timer; and
when the third autonomous denial parameter sent by the base station has not been received until the specified timer expires, determining that the base station chooses not to adjust the first autonomous denial parameter, and continuing the self-interference processing according to the first autonomous denial parameter.

According to a third aspect of the examples of the present disclosure, there is provided an apparatus for self-interference processing, the apparatus being applied to a base station, and including:
a determining module, configured to determine that a terminal has a self-interference processing capability, wherein the self-interference processing capability is achieved through an autonomous denial functionality;
a configuration module, configured to configure a first autonomous denial parameter for achieving the self-interference processing capability for the terminal; and a first sending module, configured to send the first autonomous denial parameter to the terminal, so that the terminal performs a corresponding self-interference processing according to the first autonomous denial parameter.

Optionally, the determining module includes:
a first receiving submodule, configured to receive radio access capability report information sent by the terminal, wherein the radio access capability report information includes first information for indicating that the terminal has the self-interference processing capability; and
a determining submodule, configured to determine that the terminal has the self-interference processing capability, according to the first information.

Optionally, the first receiving submodule includes:
a second receiving submodule, configured to receive a transmitted first radio resource control (RRC) signaling, wherein the first RRC signaling includes the radio access capability report information; and
an acquiring submodule, configured to acquire the radio access capability report information from the first RRC signaling.

Optionally, the first autonomous denial parameter includes at least one of:
a number of subframes designated for autonomous denial;
time designated for autonomous denial; or
a carrier designated for autonomous denial.

Optionally, the first sending module includes:
an adding submodule, configured to add the first autonomous denial parameter to a second RRC signaling; and
a sending submodule, configured to send the second RRC signaling to the terminal, so that the terminal acquires the first autonomous denial parameter from the second RRC signaling.

Optionally, the apparatus further includes:
a receiving module, configured to receive a second autonomous denial parameter sent by the terminal, wherein the second autonomous denial parameter is a parameter for achieving the self-interference processing capability recommended by the terminal;
an adjustment module, configured to, if it is chosen, according to the second autonomous denial parameter, to adjust the first autonomous denial parameter, adjust the first autonomous denial parameter according to the second autonomous denial parameter to obtain an adjusted third autonomous denial parameter; and
a second sending module, configured to send the third autonomous denial parameter to the terminal, so that the terminal stops performing the self-interference processing according to the first autonomous denial parameter, but performs the self-interference processing according to the third autonomous denial parameter.

Optionally, the third autonomous denial parameter is the same as the second autonomous denial parameter; or the third autonomous denial parameter is different from the first autonomous denial parameter and the second autonomous denial parameters.

Optionally, the apparatus further includes:
a generating module, configured to, if it is chosen, according to the second autonomous denial parameter, not to adjust the first autonomous denial parameter, generate a specific notification signaling, wherein the specific notification signaling is configured to indicate in an explicit way that the base station chooses not to adjust the first autonomous denial parameter; and
a third sending module, configured to send the specific notification signaling to the terminal, so that the terminal determines that the base station chooses not to adjust the first autonomous denial parameter, according to the specific notification signaling.

According to a fourth aspect of the examples of the present disclosure, there is provided an apparatus for self-interference processing, the apparatus being applied to terminal, and including:

a parameter receiving module, configured to receive a first autonomous denial parameter sent by a base station, wherein the first autonomous denial parameter is a parameter for achieving a self-interference processing capability of the terminal, which is configured by the base station for the terminal after the base station determines that the terminal has the self-interference processing capability achieved through an autonomous denial functionality; and a first self-interference processing module, configured to perform the self-interference processing according to the first autonomous denial parameter.

Optionally, the apparatus further includes:

an information generating module, configured to, when determining that the terminal has the self-interference processing capability, generate first information for indicating that the terminal has the self-interference processing capability;

an information adding module, configured to add the first information to radio access capability report information; and an information sending module, configured to send the radio access capability report information to the base station, so that the base station determines that the terminal has the self-interference processing capability according to the first information in the radio access capability report information.

Optionally, the information sending module includes:

an information adding submodule, configured to add the radio access capability report information to a first radio resource control (RRC) signaling; and an information sending submodule, configured to send the first RRC signaling to the base station, so that the base station acquires the radio access capability report information from the first RRC signaling.

Optionally, the first autonomous denial parameter includes at least one of:

a number of subframes designated for autonomous denial;
time designated for autonomous denial; or
a carrier designated for autonomous denial.

Optionally, the parameter receiving module includes:

an information receiving submodule, configured to receive a transmitted second RRC signaling, wherein the second RRC signaling includes the first autonomous denial parameter; and an information acquiring submodule, configured to acquire the first autonomous denial parameter from the second RRC signaling.

Optionally, the apparatus further includes:

a parameter determining module, configured to determine a second autonomous denial parameter, wherein the second autonomous denial parameter is a parameter for achieving the self-interference processing capability recommended by the terminal;

a parameter sending module, configured to send the second autonomous denial parameter to the base station, so that the base station chooses, according to the second autonomous denial parameter, to adjust the first autonomous denial parameter or not to adjust the first autonomous denial parameter; and a second self-interference processing module, configured to, if a third autonomous denial parameter sent by the base station is received, stop performing the self-interference processing according to the first autonomous denial parameter, but perform the self-interference processing according to the third autonomous denial parameter, wherein the third autonomous denial parameter is an autonomous denial parameter obtained by adjusting the first autonomous denial parameter according to the second autonomous denial parameter by the base station.

Optionally, the apparatus further includes:

a third self-interference processing module, configured to, if a specific notification signaling sent by the base station is received, wherein the specific notification signaling is configured to indicate in an explicit way that the base station chooses not to adjust the first autonomous denial parameter, continue to perform the self-interference processing according to the first autonomous denial parameter.

Optionally, the apparatus further includes:

a start module, configured to start a specific timer; and a fourth self-interference processing module, configured to, when the third autonomous denial parameter sent by the base station has not been received until the specified timer expires, determine that the base station chooses not to adjust the first autonomous denial parameter, and continue the self-interference processing according to the first autonomous denial parameter.

According to a fifth aspect of the examples of the present disclosure, there is provided a non-transitory computer readable storage medium with a computer program stored thereon, wherein the computer program is used to perform the method for self-interference processing according to the first aspect.

According to a sixth aspect of the examples of the present disclosure, there is provided a non-transitory computer readable storage medium with a computer program stored thereon, wherein the computer program is used to perform the method for self-interference processing according to the second aspect.

According to a seventh aspect of the examples of the present disclosure, there is provided an apparatus for self-interference processing, the apparatus being applied to a base station, and including:

a processor; and
a memory for storing processor executable instructions;
wherein the processor is configured to:

determine that a terminal has a self-interference processing capability, wherein the self-interference processing capability is achieved through an autonomous denial functionality;

configure a first autonomous denial parameter for achieving the self-interference processing capability for the terminal; and send the first autonomous denial parameter to the terminal, so that the terminal performs a corresponding self-interference processing according to the first autonomous denial parameter.

According to an eighth aspect of the examples of the present disclosure, there is provided an apparatus for self-interference processing, the apparatus being applied to a terminal, and including:

a processor; and
a memory for storing processor executable instructions;
wherein the processor is configured to:

receive a first autonomous denial parameter sent by a base station, wherein the first autonomous denial parameter is a parameter for achieving a self-interference processing capability of the terminal, which is configured by the base station for the terminal after the base station determines that the terminal has the self-interference processing capability achieved through an autonomous denial functionality; and perform the self-interference processing according to the first autonomous denial parameter.

The technical solutions provided by the examples of the present disclosure may include the following advantageous effects:

In the examples of the present disclosure, after determining, by a base station, that the terminal has the self-interference processing capability achieved through the autonomous denial functionality, the first autonomous denial parameter for achieving the self-interference processing capability can be configured for the terminal and the first autonomous denial parameter is sent to the terminal. And the terminal can perform the self-interference processing according to the first autonomous denial parameter. In this way, it can be achieved that the self-interference processing is performed according to a dynamic configuration of the base station, thus improving flexibility and reliability of self-interference processing.

In the examples of the present disclosure, by receiving, by a terminal, a first autonomous denial parameter sent by a base station and performing a self-interference processing according to the first autonomous denial parameter, it can be achieved that the self-interference processing is performed according to a dynamic configuration of the base station, thus improving flexibility and reliability of self-interference processing.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
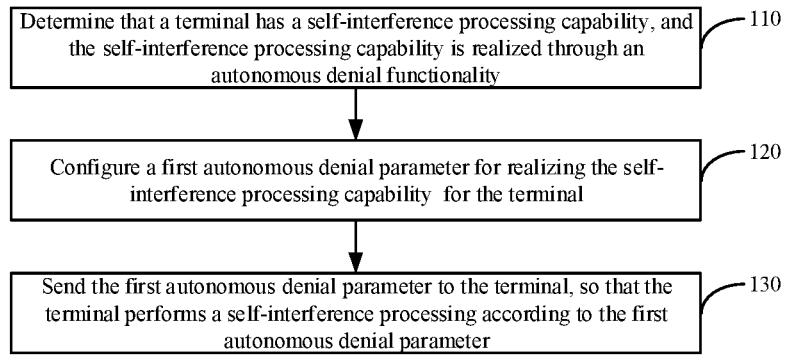
FIG. 1 is a flowchart illustrating a method for self-interference processing according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 2:
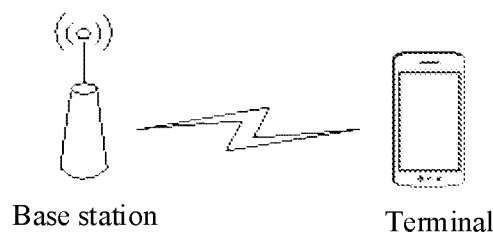
FIG. 2 is an application scenario diagram illustrating a method for self-interference processing according to an example.

FIG. 1 is a flowchart illustrating a method for self-interference processing according to an example. FIG. 2 is an application scenario diagram illustrating a method for self-interference processing according to an example. The method for self-interference processing is applicable to a base station. As shown in FIG. 1, the method for self-interference processing includes the following steps 110-130.

At step 110, it is determined that a terminal has a self-interference processing capability, and the self-interference processing capability is achieved through an autonomous denial functionality.

In the examples of the present disclosure, a base station may determine whether a terminal has a self-interference processing capability by using multiple methods. Moreover, in the present disclosure, the self-interference processing capability may be achieved by the terminal through an autonomous denial functionality.

In an example, at step 110, a base station may determine whether a terminal has a self-interference processing capability according to radio access capability report information sent by the terminal. The implementation process thereof may include:

(1-1) receiving radio access capability report information sent by the terminal, where the radio access capability report information includes first information for indicating that the terminal has the self-interference processing capability;

(1-2) determining that the terminal has the self-interference processing capability, according to the first information.

In an example, at step (1-1), since the terminal may send the radio access capability report information to the base station through a first radio resource control (RRC for short) signaling, correspondingly, the base station may acquire the radio access capability report information from the first RRC signaling. The implementation process thereof may include:

(2-1) receiving the transmitted first RRC signaling, where the first RRC signaling includes the radio access capability report information;

(2-2) acquiring the radio access capability report information from the first RRC signaling.

At step 120, a first autonomous denial parameter for achieving the self-interference processing capability is configured for the terminal.

In the examples of the present disclosure, after a base station determines that a terminal has a self-interference processing capability achieved through an autonomous denial functionality, if the terminal is allowed to achieve the self-interference processing capability through the autonomous denial functionality, a first autonomous denial parameter for achieving the self-interference processing capability can be configured for the terminal. Alternatively, if the terminal is not allowed to achieve the self-interference processing capability through the autonomous denial functionality, the first autonomous denial parameter for achieving the self-interference processing capability may not be configured for the terminal.

The detailed content of the first autonomous denial parameter can be configured by the base station according to an actual situation.

In an example, the first autonomous denial parameter at step 120 may include but is not limited to at least one of the following:

(3-1) a number of subframes designated for autonomous denial;

(3-2) time designated for autonomous denial; or (3-3) a carrier designated for autonomous denial.

At step 130, the first autonomous denial parameter is sent to the terminal. Thus, the terminal performs a self-interference processing according to the first autonomous denial parameter.

In the examples of the present disclosure, a base station may safely send a first autonomous denial parameter to a terminal by using multiple transmission methods.

In an example, at step 130, in order to improve security of transmission of the first autonomous denial parameter, a base station may send the first autonomous denial parameter to the terminal through a second RRC signaling. The implementation process may include:

(4-1) adding the first autonomous denial parameter to the second RRC signaling;

(4-2) sending the second RRC signaling to the terminal. Thus, the terminal acquires the first autonomous denial parameter from the second RRC signaling.

In an exemplary scenario, as shown in FIG. 2, a terminal and a base station are included. After determining that the terminal has a self-interference processing capability achieved through an autonomous denial functionality, the base station can configure a first autonomous denial parameter for achieving the self-interference processing capability for the terminal, and send the first autonomous denial parameter to the terminal. In this way, the terminal can perform the self-interference processing according to the first autonomous denial parameter configured by the base station.

It can be seen from the examples that, after determining that the terminal has the self-interference processing capability achieved through the autonomous denial functionality, the first autonomous denial parameter for achieving the self-interference processing capability can be configured for the terminal and the first autonomous denial parameter is sent to the terminal. And the terminal can perform the self-interference processing according to the first autonomous denial parameter. In this way, it can be achieved that the self-interference processing is performed according to a dynamic configuration of a base station, thus improving flexibility and reliability of self-interference processing.

Figure 3:
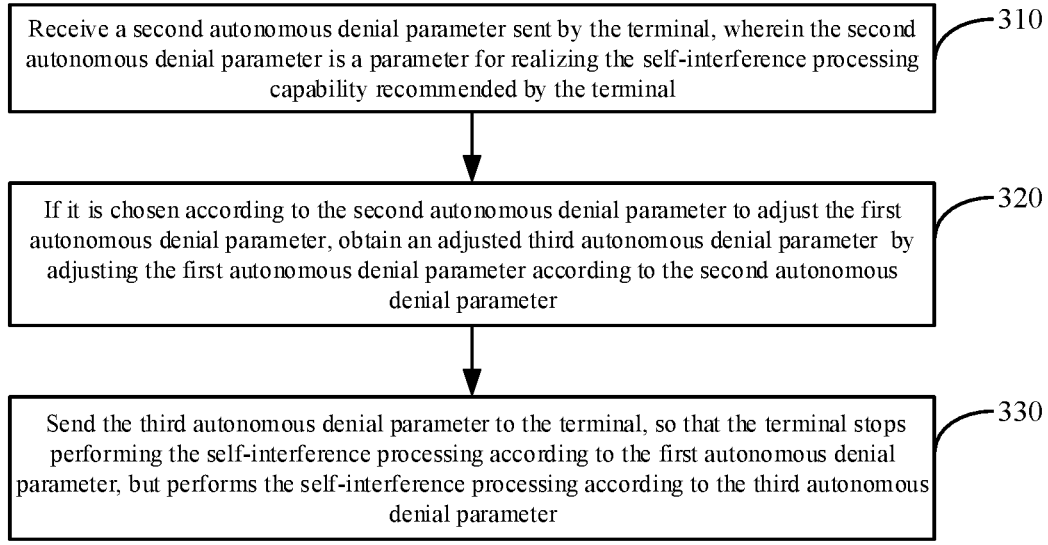
FIG. 3 is a flowchart illustrating another method for self-interference processing according to an example.

FIG. 3 is a flowchart illustrating another method for self-interference processing according to an example. The method for self-interference processing is appliable to a base station, and on the basis of the method shown in FIG. 1, as shown in FIG. 3, the method for self-interference processing further includes the following steps 310-330.

At step 310, a second autonomous denial parameter sent by the terminal is received, wherein the second autonomous denial parameter is a parameter for achieving the self-interference processing capability recommended by the terminal.

In the examples of the present disclosure, a second autonomous denial parameter may be an autonomous denial parameter recommended by a terminal to a base station according to its own needs. The terminal recommends the second autonomous denial parameter after it determines that a first autonomous denial parameter cannot meet its own needs when performing a self-interference processing according to the first autonomous denial parameter. That is, the second autonomous denial parameter is an autonomous denial parameter expected to be configured by the base station for the terminal.

After receiving the second autonomous denial parameter, the base station may choose, according to the second autonomous denial parameter, to adjust the first autonomous denial parameter or not to adjust the first autonomous denial parameter, which is determined based on an actual situation.

At step 320, if it is chosen, according to the second autonomous denial parameter, to adjust the first autonomous denial parameter, an adjusted third autonomous denial parameter is obtained by adjusting the first autonomous denial parameter according to the second autonomous denial parameter.

In the examples of the present disclosure, a base station may decide how to adjust a first autonomous denial parameter according to a second autonomous denial parameter, according to an actual situation.

In an example, if a second autonomous denial parameter is fully acceptable by a base station, an adjusted third autonomous denial parameter may be the same as the second autonomous denial parameter recommended by a terminal.

In an example, if a base station only uses a second autonomous denial parameter recommended by a terminal as an adjustment reference, an adjusted third autonomous denial parameter may be different from a first autonomous denial parameter configured by the base station and the second autonomous denial parameter recommended by the terminal.

At step 330, the third autonomous denial parameter is sent to the terminal. Thus, the terminal stops performing the self-interference processing according to the first autonomous denial parameter, but performs the self-interference processing according to the third autonomous denial parameter.

In the examples of the present disclosure, in order to improve security of transmission of a third autonomous denial parameter, the third autonomous denial parameter may be transmitted to a terminal through an RRC signaling.

It can be seen from the examples that, after receiving a second autonomous denial parameter sent by a terminal, which is an autonomous denial parameter for achieving a self-interference processing capability recommended by the terminal device, if it is chosen, according to the second autonomous denial parameter, to adjust the first autonomous denial parameter, an adjusted third autonomous denial parameter can be obtained by adjusting the first autonomous denial parameter according to the second autonomous denial parameter, and the third autonomous denial parameter is sent to the terminal. Thus, the terminal can stop performing the self-interference processing according to the first autonomous denial parameter, but perform the self-interference processing according to the third autonomous denial parameter. In this way, it can be achieved that the self-interference processing is performed according to a dynamic configuration of a base station, thus improving flexibility and reliability of self-interference processing.

Figure 4:
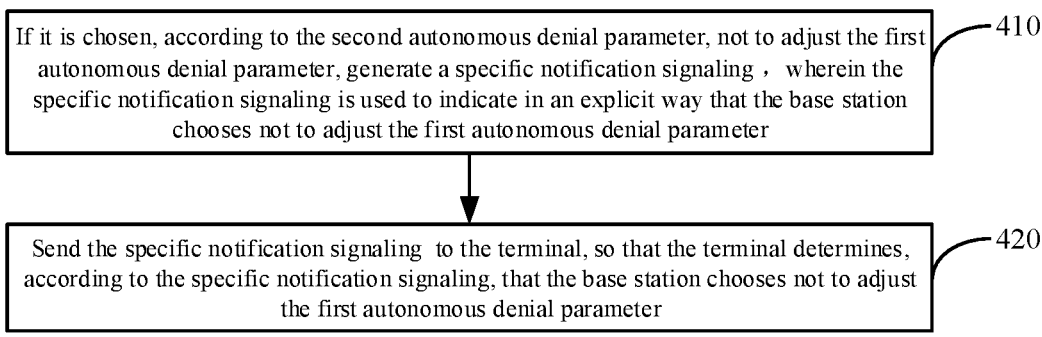
FIG. 4 is a flowchart illustrating another method for self-interference processing according to an example.

FIG. 4 is a flowchart illustrating another method for self-interference processing according to an example. The method for self-interference processing is appliable to a base station, and on the basis of the method shown in FIG. 3, as shown in FIG. 4, the method for self-interference processing further includes the following steps 410-420.

At step 410, if it is chosen, according to the second autonomous denial parameter, not to adjust the first autonomous denial parameter, a specific notification signaling is generated. The specific notification signaling is used to indicate in an explicit way that the base station chooses not to adjust the first autonomous denial parameter.

In the examples of the present disclosure, if a base station chooses, according to a second autonomous denial parameter, not to adjust a first autonomous denial parameter, in order to avoid delay of a self-interference processing of a terminal, the base station may notify the terminal through a specific notification signaling. In this way, after receiving the specific notification signaling, the terminal device will be timely and accurately notified that the base station chooses not to adjust the first autonomous denial parameter, and continue to perform the self-interference processing according to the first autonomous denial parameter configured by the base station.

At step 420, the specific notification signaling is sent to the terminal, so that the terminal determines, according to the specific notification signaling, that the base station chooses not to adjust the first autonomous denial parameter.

It can be seen from the examples that, if it is chosen, according to a second autonomous denial parameter, not to adjust a first autonomous denial parameter, a specific notification signaling can be directly generated and sent to a terminal. The specific notification signaling is used to indicate in an explicit way that a base station chooses not to adjust the first autonomous denial parameter. Thus, a terminal can determine according to the specific notification signaling that the base station chooses not to adjust the first autonomous denial parameter, and continue to perform a self-interference processing according to the first autonomous denial parameter. In this way, it is achieved that the self-interference processing is continued to be performed according to the explicit indication from the base station, and reliability of the self-interference processing is ensured.

Figure 5:
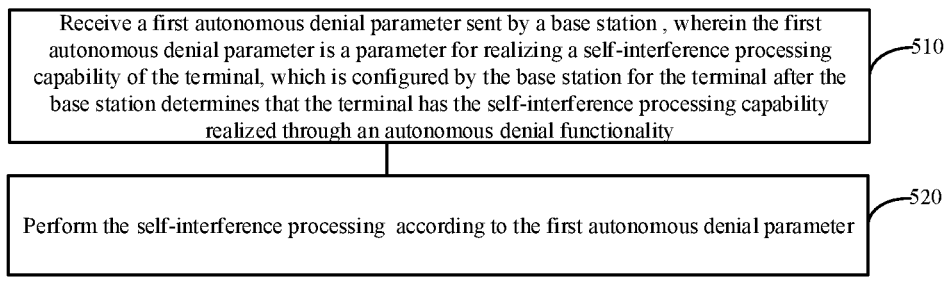
FIG. 5 is a flowchart illustrating a method for self-interference processing according to an example.

FIG. 5 is a flowchart illustrating a method for self-interference processing according to an example. The method for self-interference processing is applicable to a terminal. As shown in FIG. 5, the method for self-interference processing includes the following steps 510-530.

At step 510, a first autonomous denial parameter sent by a base station is received, wherein the first autonomous denial parameter is a parameter for achieving a self-interference processing capability of the terminal, which is configured by the base station for the terminal after the base station determines that the terminal has the self-interference processing capability achieved through an autonomous denial functionality.

In an example, at step 510, if the base station needs to determine, according to radio access capability report information sent by the terminal, whether the terminal has the self-interference processing capability achieved through the autonomous denial functionality, after determining that the terminal has the self-interference processing capability, the terminal can notify the base station through the radio access capability report information. The implementation process thereof may include:

(5-1) when determining that the terminal has the self-interference processing capability, generating first information for indicating that the terminal has the self-interference processing capability;

(5-2) adding the first information to the radio access capability report information; and (5-3) sending the radio access capability report information to the base station, so that the base station determines that the terminal has the self-interference processing capability according to the first information in the radio access capability report information.

In an example, at step (5-3), in order to ensure reliability of transmission of the radio access capability report information, the terminal may send the radio access capability report information to the base station through a first RRC signaling. The implementation process thereof may include:

(6-1) adding the radio access capability report information to the first RRC signaling; and (6-2) acquiring the radio access capability report information from the first RRC signaling.

In an example, the first autonomous denial parameter at step 510 may include but is not limited to at least one of the following:

(7-1) a number of subframes designated for autonomous denial;

(7-2) time designated for autonomous denial; or (7-3) a carrier designated for autonomous denial.

In an example, at step 510, since the base station may send the first autonomous denial parameter to the terminal through a second RRC signaling, correspondingly, the terminal may acquire the first autonomous denial parameter from the second RRC signaling. The implementation process thereof may include:

(8-1) receiving a transmitted second RRC signaling, wherein the second RRC signaling includes the first autonomous denial parameter; and (8-2) acquiring the first autonomous denial parameter from the second RRC signaling.

At step 520, the self-interference processing is performed according to the first autonomous denial parameter.

In the examples of the present disclosure, when performing a self-interference processing according to a first autonomous denial parameter, a terminal may perform an autonomous denial operation according to the first autonomous denial parameter.

It can be seen from the examples that, by receiving a first autonomous denial parameter sent by a base station and performing a self-interference processing according to the first autonomous denial parameter, it can be achieved that the self-interference processing is performed according to a dynamic configuration of the base station, thus improving flexibility and reliability of self-interference processing.

Figure 6:
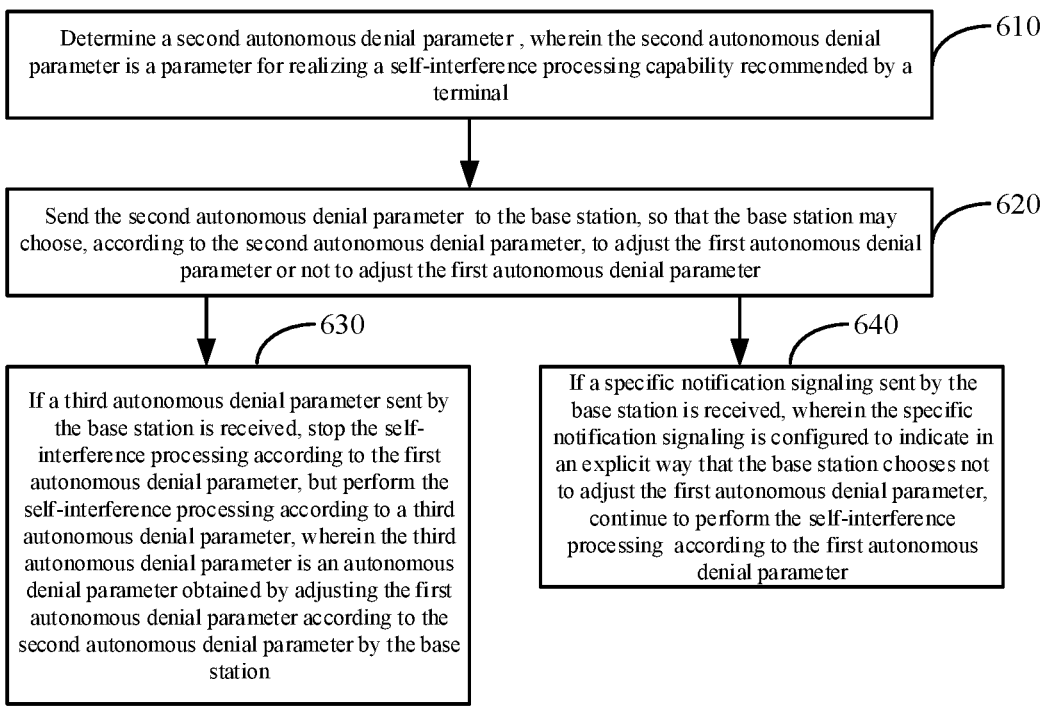
FIG. 6 is a flowchart illustrating another method for self-interference processing according to an example.

FIG. 6 is a flowchart illustrating another method for self-interference processing according to an example. The method for self-interference processing is applicable to a terminal, and on the basis of the method shown in FIG. 5. As shown in FIG. 6, the method for self-interference processing includes the following steps 610-630.

At step 610, a second autonomous denial parameter is determined, wherein the second autonomous denial parameter is a parameter for achieving a self-interference processing capability recommended by a terminal.

In the examples of the present disclosure, a second autonomous denial parameter may be an autonomous denial parameter recommended by a terminal to a base station according to its own needs. The terminal recommends the second autonomous denial parameter after it determines that a first autonomous denial parameter cannot meet its own needs when performing a self-interference processing according to the first autonomous denial parameter. That is, the second autonomous denial parameter is an autonomous denial parameter expected to be configured by the base station for the terminal.

At step 620, the second autonomous denial parameter is sent to the base station, so that the base station may choose, according to the second autonomous denial parameter, to adjust the first autonomous denial parameter or not to adjust the first autonomous denial parameter.

At step 630, if a third autonomous denial parameter sent by the base station is received, the self-interference processing according to the first autonomous denial parameter is stopped, and the self-interference processing is performed according to a third autonomous denial parameter, wherein the third autonomous denial parameter is an autonomous denial parameter obtained by adjusting the first autonomous denial parameter according to the second autonomous denial parameter by the base station.

In the examples of the present disclosure, since a base station may decide how to adjust a first autonomous denial parameter according to a second autonomous denial parameter, according to an actual situation, an adjusted third autonomous denial parameter may be the same as or different from the second autonomous denial parameter recommended by a terminal.

In an example, if a second autonomous denial parameter is fully acceptable by a base station, an adjusted third autonomous denial parameter may be the same as the second autonomous denial parameter recommended by a terminal.

In an example, if a base station only uses a second autonomous denial parameter recommended by a terminal as an adjustment reference, an adjusted third autonomous denial parameter may be different from a first autonomous denial parameter configured by the base station and the second autonomous denial parameter recommended by the terminal.

In an example, as shown in FIG. 6, the method further includes following step 640.

If a specific notification signaling sent by the base station is received, wherein the specific notification signaling is configured to indicate in an explicit way that the base station chooses not to adjust the first autonomous denial parameter, the self-interference processing is continued to be performed according to the first autonomous denial parameter.

It can be seen from the examples that, after determining a second autonomous denial parameter, wherein the second autonomous denial parameter is an autonomous denial parameter for achieving a self-interference processing capability recommended by a terminal, the second autonomous denial parameter is sent to the base station, so that the base station may choose, according to the second autonomous denial parameter, to adjust the first autonomous denial parameter or not to adjust the first autonomous denial parameter. If a third autonomous denial parameter sent by the base station is received, wherein the third autonomous denial parameter is an autonomous denial parameter obtained by adjusting the first autonomous denial parameter according to the second autonomous denial parameter by the base station, the self-interference processing according to the first autonomous denial parameter is stopped, and the self-interference processing is performed according to the third autonomous denial parameter. In this way, it can be achieved that the self-interference processing is performed according to a dynamic adjustment of a base station, thus improving efficiency and accuracy of self-interference processing. In addition, if a specific notification signaling sent by the base station is received, wherein the specific notification signaling is configured to indicate in an explicit way that the base station chooses not to adjust the first autonomous denial parameter, the self-interference processing is continued to be performed according to the first autonomous denial parameter. In this way, it is achieved that the self-interference processing is continued to be performed according to the explicit indication from the base station, and reliability of the self-interference processing is ensured.

Figure 7:
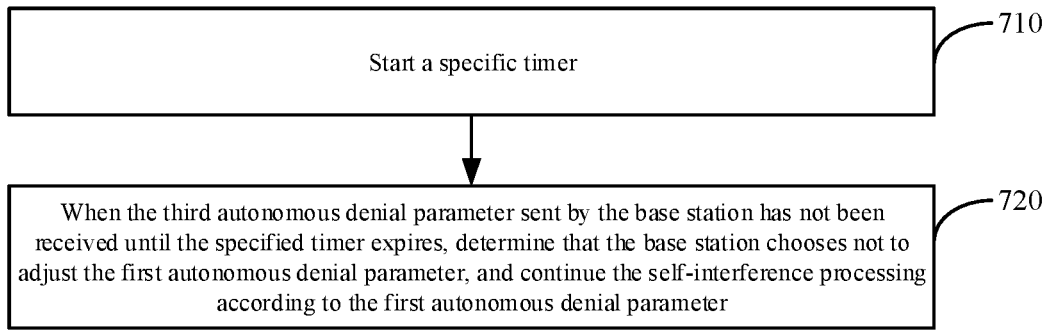
FIG. 7 is a flowchart illustrating another method for self-interference processing according to an example.

FIG. 7 is a flowchart illustrating another method for self-interference processing according to an example. The method for self-interference processing is applicable to a terminal, and on the basis of the method shown in FIG. 6, as shown in FIG. 7, the method for self-interference processing further includes the following steps 710-720.

At step 710, a specific timer is started.

In the examples of the present disclosure, if a base station chooses, according to a second autonomous denial parameter, not to adjust a first autonomous denial parameter, the base station may not notify a terminal of its choice. It may be automatically confirmed that the base station chooses not to adjust the first autonomous denial parameter when the terminal has not received a third autonomous denial parameter sent by the base station within a period of time.

Duration of a specific timer is a designated duration for detecting whether a third autonomous denial parameter sent by a base station is received. Start time of the specific timer started by the terminal can be determined according to an actual situation.

For example, the specific timer is started when the second autonomous denial parameter is sent to the base station.

At step 720, when the third autonomous denial parameter sent by the base station has not been received until the specified timer expires, it is determined that the base station chooses not to adjust the first autonomous denial parameter, and the self-interference processing is continued according to the first autonomous denial parameter.

It can be seen from the examples that a specific timer can be started, and when a third autonomous denial parameter sent by a base station has not been received until the specific timer expires, it is determined that the base station chooses not to adjust a first autonomous denial parameter, and a self-interference processing is continued according to the first autonomous denial parameter. In this way, it is automatically defaulted to that the base station chooses not to adjust the first autonomous denial parameter according to certain rules, thus enriching implementation methods for self-interference processing, and improving utility of self-interference processing.

Figure 8:
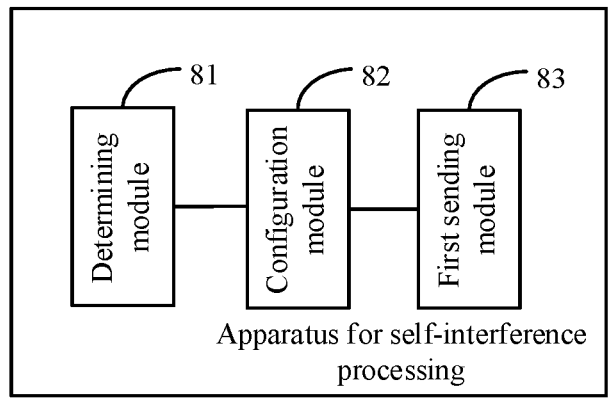
FIG. 8 is a block diagram illustrating an apparatus for self-interference processing according to an example.

FIG. 8 is a block diagram illustrating an apparatus for self-interference processing according to an example. The apparatus is applicable to a base station and used to perform the method for self-interference processing shown in FIG. 1. As shown in FIG. 8, the apparatus for self-interference processing may include:

a determining module 81, configured to determine that a terminal has a self-interference processing capability, wherein the self-interference processing capability is achieved through an autonomous denial functionality;

a configuration module 82, configured to configure a first autonomous denial parameter for achieving the self-interference processing capability for the terminal; and a first sending module 83, configured to send the first autonomous denial parameter to the terminal, so that the terminal performs a self-interference processing according to the first autonomous denial parameter.

It can be seen from the examples that, after determining that the terminal has the self-interference processing capability achieved through the autonomous denial functionality, the first autonomous denial parameter for achieving the self-interference processing capability can be configured for the terminal and the first autonomous denial parameter is sent to the terminal. And the terminal can perform the self-interference processing according to the first autonomous denial parameter. In this way, it can be achieved that the self-interference processing is performed according to a dynamic configuration of a base station, thus improving flexibility and reliability of self-interference processing.

Figure 9:
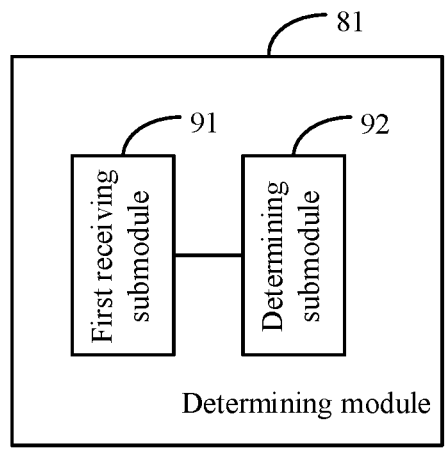
FIG. 9 is a block diagram illustrating another apparatus for self-interference processing according to an example.

In an example, on the basis of the apparatus shown in FIG. 8, as shown in FIG. 9, the determining module 81 may include:

a first receiving submodule 91, configured to receive radio access capability report information sent by the terminal, wherein the radio access capability report information includes first information for indicating that the terminal has the self-interference processing capability; and a determining submodule 92, configured to determine that the terminal has the self-interference processing capability, according to the first information.

Figure 10:
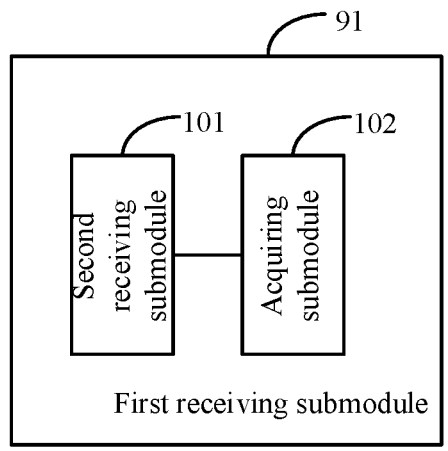
FIG. 10 is a block diagram illustrating another apparatus for self-interference processing according to an example.

In an example, on the basis of the apparatus shown in FIG. 9, as shown in FIG. 10, the first receiving submodule 91 may include:

a second receiving submodule 101, configured to receive a transmitted first radio resource control (RRC) signaling, wherein the first RRC signaling includes the radio access capability report information; and an acquiring submodule 102, configured to acquire the radio access capability report information from the first RRC signaling.

In an example, on the basis of the apparatus shown in FIG. 8, the first autonomous denial parameter includes at least one of:

a number of subframes designated for autonomous denial;
time designated for autonomous denial; or
a carrier designated for autonomous denial.

Figure 11:
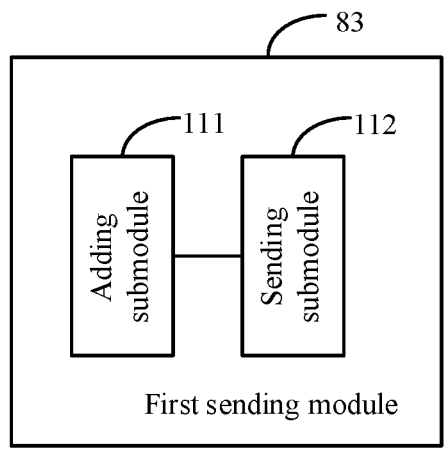
FIG. 11 is a block diagram illustrating another apparatus for self-interference processing according to an example.

In an example, on the basis of the apparatus shown in FIG. 8, as shown in FIG. 11, the first sending module 83 may include:

an adding submodule 111, configured to add the first autonomous denial parameter to a second RRC signaling; and a sending submodule 112, configured to send the second RRC signaling to the terminal, so that the terminal acquires the first autonomous denial parameter from the second RRC signaling.

Figure 12:
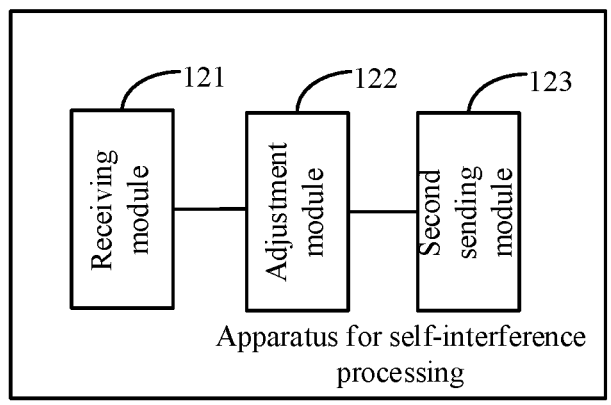
FIG. 12 is a block diagram illustrating another apparatus for self-interference processing according to an example.

In an example, on the basis of the apparatus shown in FIG. 8, as shown in FIG. 12, the apparatus may further include:

a receiving module 121, configured to receive a second autonomous denial parameter sent by the terminal, wherein the second autonomous denial parameter is a parameter for achieving the self-interference processing capability recommended by the terminal;

an adjustment module 122, configured to, if it is chosen, according to the second autonomous denial parameter, to adjust the first autonomous denial parameter, adjust the first autonomous denial parameter according to the second autonomous denial parameter to obtain an adjusted third autonomous denial parameter; and a second sending module 123, configured to send the third autonomous denial parameter to the terminal, so that the terminal stops performing the self-interference processing according to the first autonomous denial parameter, but performs the self-interference processing according to the third autonomous denial parameter.

It can be seen from the examples that, after receiving a second autonomous denial parameter sent by a terminal, which is an autonomous denial parameter for achieving a self-interference processing capability recommended by the terminal device, if it is chosen, according to the second autonomous denial parameter, to adjust the first autonomous denial parameter, an adjusted third autonomous denial parameter can be obtained by adjusting the first autonomous denial parameter according to the second autonomous denial parameter, and the third autonomous denial parameter is sent to the terminal. Thus, the terminal can stop performing the self-interference processing according to the first autonomous denial parameter, but perform the self-interference processing according to the third autonomous denial parameter. In this way, it can be achieved that the self-interference processing is performed according to a dynamic configuration of a base station, thus improving flexibility and reliability of self-interference processing.

In an example, on the basis of the apparatus shown in FIG. 8, the third autonomous denial parameter is the same as the second autonomous denial parameter; or the third autonomous denial parameter is different from the first autonomous denial parameter and the second autonomous denial parameters.

Figure 13:
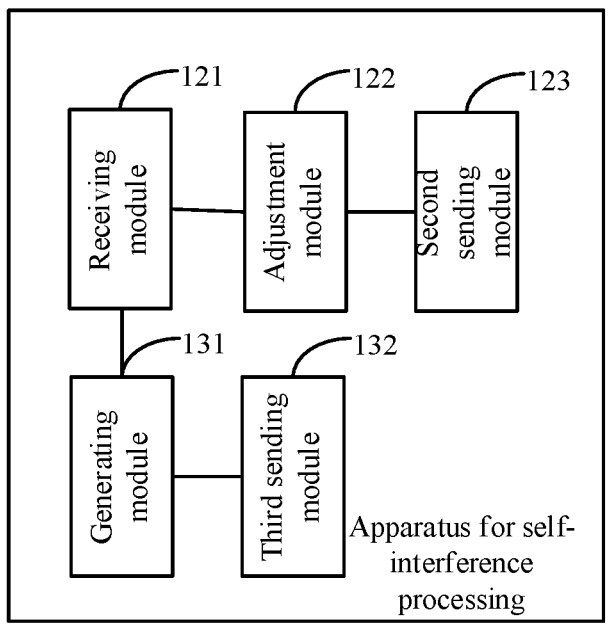
FIG. 13 is a block diagram illustrating another apparatus for self-interference processing according to an example.

In an example, on the basis of the apparatus shown in FIG. 12, as shown in FIG. 13, the apparatus may further include:

a generating module 131, configured to, if it is chosen, according to the second autonomous denial parameter, not to adjust the first autonomous denial parameter, generate a specific notification signaling, wherein the specific notification signaling is configured to indicate in an explicit way that the base station chooses not to adjust the first autonomous denial parameter; and a third sending module 132, configured to send the specific notification signaling to the terminal, so that the terminal determines that the base station chooses not to adjust the first autonomous denial parameter, according to the specific notification signaling.

It can be seen from the examples that, if it is chosen, according to a second autonomous denial parameter, not to adjust a first autonomous denial parameter, a specific notification signaling can be directly generated and sent to a terminal. The specific notification signaling is used to indicate in an explicit way that a base station chooses not to adjust the first autonomous denial parameter. Thus, a terminal can determine according to the specific notification signaling that the base station chooses not to adjust the first autonomous denial parameter, and continue to perform a self-interference processing according to the first autonomous denial parameter. In this way, it is achieved that the self-interference processing is continued to be performed according to the explicit indication from the base station, and reliability of the self-interference processing is ensured.

Figure 14:
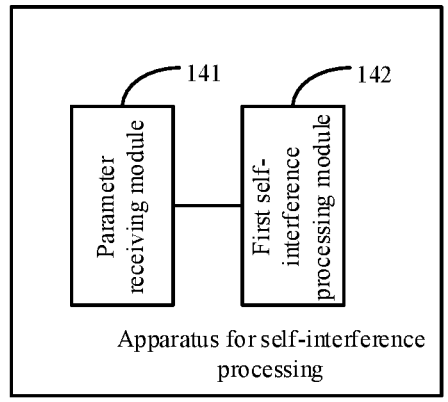
FIG. 14 is a block diagram illustrating an apparatus for self-interference processing according to an example.

FIG. 14 is a block diagram illustrating an apparatus for self-interference processing according to an example. The apparatus is applicable to a terminal and used to perform the method for self-interference processing shown in FIG. 5. As shown in FIG. 14, the apparatus for self-interference processing may include:

a parameter receiving module 141, configured to receive a first autonomous denial parameter sent by a base station, wherein the first autonomous denial parameter is a parameter for achieving a self-interference processing capability of the terminal, which is configured by the base station for the terminal after the base station determines that the terminal has the self-interference processing capability achieved through an autonomous denial functionality; and a first self-interference processing module 142, configured to perform the self-interference processing according to the first autonomous denial parameter.

It can be seen from the examples that, by receiving a first autonomous denial parameter sent by a base station and performing a self-interference processing according to the first autonomous denial parameter, it can be achieved that the self-interference processing is performed according to a dynamic configuration of the base station, thus improving flexibility and reliability of self-interference processing.

Figure 15:
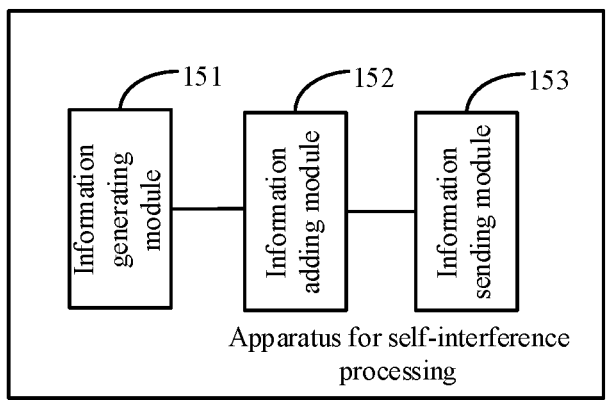
FIG. 15 is a block diagram illustrating another apparatus for self-interference processing according to an example.

In an example, on the basis of the apparatus shown in FIG. 14, as shown in FIG. 15, the apparatus may further include:

an information generating module 151, configured to, when determining that the terminal has the self-interference processing capability, generate first information for indicating that the terminal has the self-interference processing capability;

an information adding module 152, configured to add the first information to radio access capability report information; and an information sending module 153, configured to send the radio access capability report information to the base station, so that the base station determines that the terminal has the self-interference processing capability according to the first information in the radio access capability report information.

Figure 16:
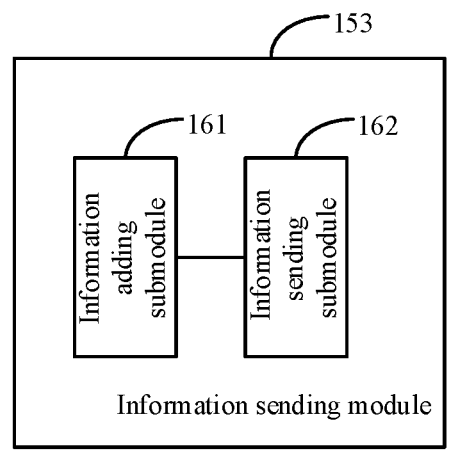
FIG. 16 is a block diagram illustrating another apparatus for self-interference processing according to an example.

In an example, on the basis of the apparatus shown in FIG. 15, as shown in FIG. 16, the information sending module 153 may include:

an information adding submodule 161, configured to add the radio access capability report information to a first radio resource control (RRC) signaling; and an information sending submodule 162, configured to send the first RRC signaling to the base station, so that the base station acquires the radio access capability report information from the first RRC signaling.

In an example, on the basis of the apparatus shown in FIG. 14, the first autonomous denial parameter includes at least one of:

a number of subframes designated for autonomous denial;
time designated for autonomous denial; or
a carrier designated for autonomous denial.

Figure 17:
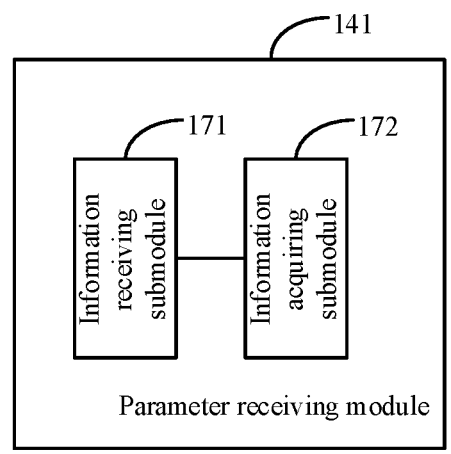
FIG. 17 is a block diagram illustrating another apparatus for self-interference processing according to an example.

In an example, on the basis of the apparatus shown in FIG. 14, as shown in FIG. 17, the parameter receiving module 141 may include:

an information receiving submodule 171, configured to receive a transmitted second RRC signaling, wherein the second RRC signaling includes the first autonomous denial parameter; and an information acquiring submodule 172, configured to acquire the first autonomous denial parameter from the second RRC signaling.

Figure 18:
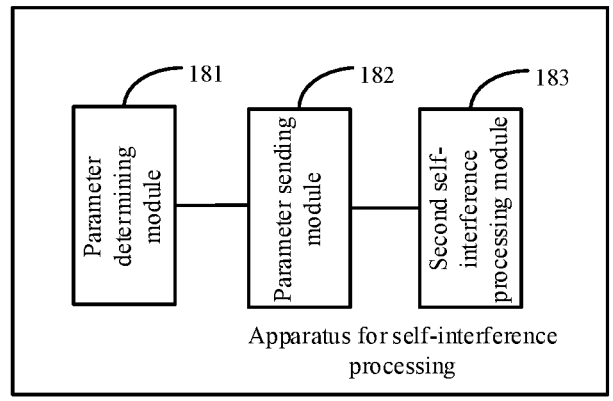
FIG. 18 is a block diagram illustrating another apparatus for self-interference processing according to an example.

In an example, on the basis of the apparatus shown in FIG. 14, as shown in FIG. 18, the apparatus may further include:

a parameter determining module 181, configured to determine a second autonomous denial parameter, wherein the second autonomous denial parameter is a parameter for achieving the self-interference processing capability recommended by the terminal;

a parameter sending module 182, configured to send the second autonomous denial parameter to the base station, so that the base station chooses, according to the second autonomous denial parameter, to adjust the first autonomous denial parameter or not to adjust the first autonomous denial parameter; and a second self-interference processing module 183, configured to, if a third autonomous denial parameter sent by the base station is received, stop performing the self-interference processing according to the first autonomous denial parameter, but perform the self-interference processing according to the third autonomous denial parameter, wherein the third autonomous denial parameter is an autonomous denial parameter obtained by adjusting the first autonomous denial parameter according to the second autonomous denial parameter by the base station.

It can be seen from the examples that, after determining a second autonomous denial parameter, wherein the second autonomous denial parameter is an autonomous denial parameter for achieving a self-interference processing capability recommended by a terminal, the second autonomous denial parameter is sent to the base station, so that the base station may choose, according to the second autonomous denial parameter, to adjust the first autonomous denial parameter or not to adjust the first autonomous denial parameter. If a third autonomous denial parameter sent by the base station is received, wherein the third autonomous denial parameter is an autonomous denial parameter obtained by adjusting the first autonomous denial parameter according to the second autonomous denial parameter by the base station, the self-interference processing according to the first autonomous denial parameter is stopped, and the self-interference processing is performed according to the third autonomous denial parameter. In this way, it can be achieved that the self-interference processing is performed according to a dynamic adjustment of a base station, thus improving efficiency and accuracy of self-interference processing.

Figure 19:
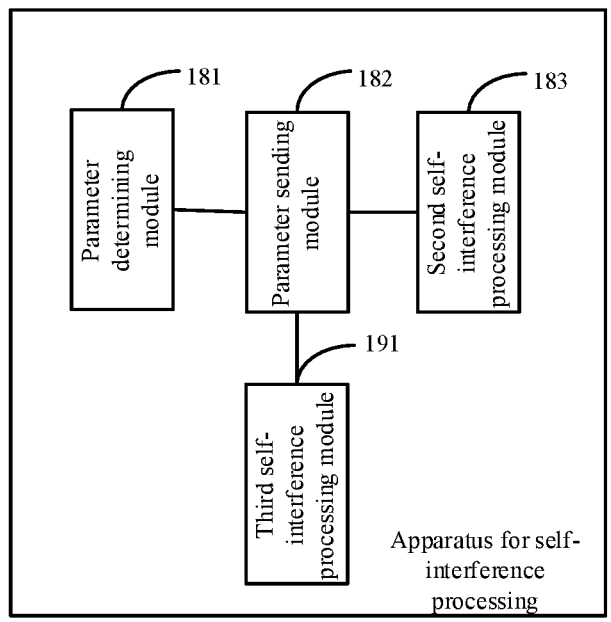
FIG. 19 is a block diagram illustrating another apparatus for self-interference processing according to an example.

In an example, on the basis of the apparatus shown in FIG. 18, as shown in FIG. 19, the apparatus may further include:

a third self-interference processing module 191, configured to, if a specific notification signaling sent by the base station is received, wherein the specific notification signaling is configured to indicate in an explicit way that the base station chooses not to adjust the first autonomous denial parameter, continue to perform the self-interference processing according to the first autonomous denial parameter.

It can be seen from the examples that, if a specific notification signaling sent by the base station is received, wherein the specific notification signaling is configured to indicate in an explicit way that the base station chooses not to adjust the first autonomous denial parameter, the self-interference processing is continued to be performed according to the first autonomous denial parameter. In this way, it is achieved that the self-interference processing is continued to be performed according to the explicit indication from the base station, and reliability of the self-interference processing is ensured.

Figure 20:
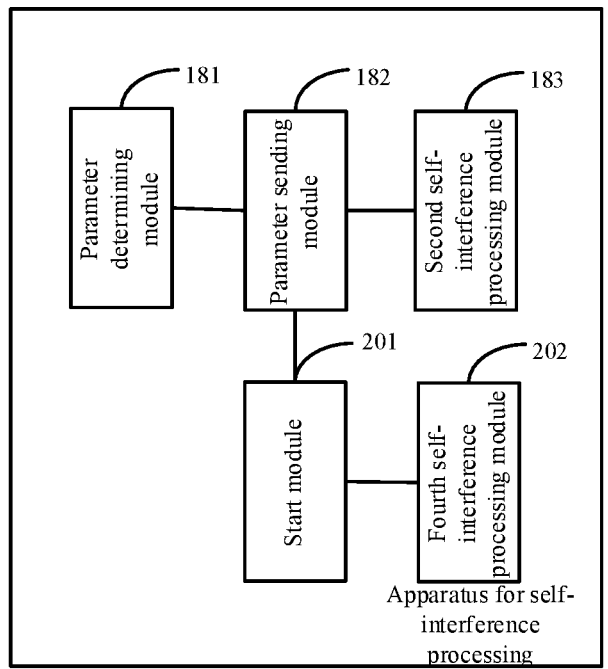
FIG. 20 is a block diagram illustrating another apparatus for self-interference processing according to an example.

In an example, on the basis of the apparatus shown in FIG. 18, as shown in FIG. 20, the apparatus may further include:

a start module 201, configured to start a specific timer; and a fourth self-interference processing module 202, configured to, when the third autonomous denial parameter sent by the base station has not been received until the specified timer expires, determine that the base station chooses not to adjust the first autonomous denial parameter, and continue the self-interference processing according to the first autonomous denial parameter.

It can be seen from the examples that a specific timer can be started, and when a third autonomous denial parameter sent by a base station has not been received until the specific timer expires, it is determined that the base station chooses not to adjust a first autonomous denial parameter, and a self-interference processing is continued according to the first autonomous denial parameter. In this way, it is automatically defaulted to that the base station chooses not to adjust the first autonomous denial parameter according to certain rules, thus enriching implementation methods for self-interference processing, and improving utility of self-interference processing.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

Correspondingly, the present disclosure further provides a non-transitory computer readable storage medium with a computer program stored thereon, wherein the computer program is used to perform the method for self-interference processing according to any one of FIGS. 1-4.

Correspondingly, the present disclosure further provides a non-transitory computer readable storage medium with a computer program stored thereon, wherein the computer program is used to perform the method for self-interference processing according to according to any one of FIGS. 5-7.

Correspondingly, the present disclosure further provides an apparatus for self-interference processing, the apparatus being applied to a base station, and including:

a processor; and a memory for storing processor executable instructions;

wherein the processor is configured to:

determine that a terminal has a self-interference processing capability, wherein the self-interference processing capability is achieved through an autonomous denial functionality;

configure a first autonomous denial parameter for achieving the self-interference processing capability for the terminal; and send the first autonomous denial parameter to the terminal, so that the terminal performs a self-interference processing according to the first autonomous denial parameter.

Figure 21:
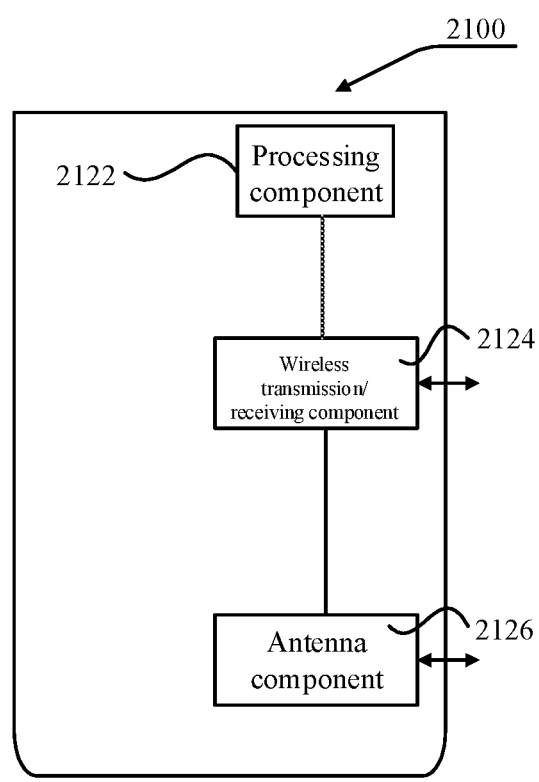
FIG. 21 is a schematic structural diagram illustrating an apparatus for self-interference processing according to an example.

As shown in FIG. 21, FIG. 21 is a schematic structural diagram illustrating an apparatus for self-interference processing according to an example. The apparatus 2100 may be provided as a base station. With reference to FIG. 21, the apparatus 2100 includes a processing component 2122, a wireless transmission/receiving component 2124, an antenna component 2126, and a signal processing part specific to a wireless interface. The processing component 2122 may further include one or more processors.

One processor in the processing component 2122 may be configured to perform the steps in the method according to any one of above examples.

Correspondingly, the present disclosure further provides an apparatus for self-interference processing, the apparatus being applied to a terminal, and including:

a processor; and a memory for storing processor executable instructions;

wherein the processor is configured to:

receive a first autonomous denial parameter sent by a base station, wherein the first autonomous denial parameter is a parameter for achieving a self-interference processing capability of the terminal, which is configured by the base station for the terminal after the base station determines that the terminal has the self-interference processing capability achieved through an autonomous denial functionality; and perform the self-interference processing according to the first autonomous denial parameter.

Figure 22:
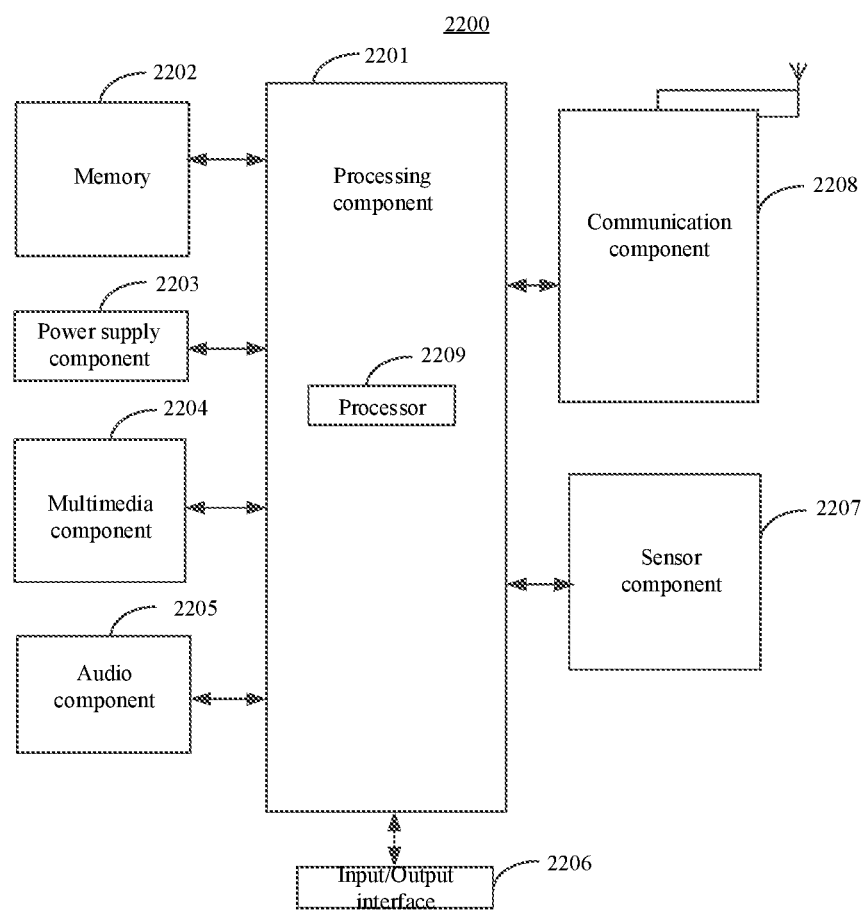
FIG. 22 is a schematic structural diagram illustrating an apparatus for self-interference processing according to an example.

FIG. 22 is a schematic structural diagram illustrating an apparatus for self-interference processing according to an example. As shown in FIG. 22, according to an example, the apparatus for self-interference processing 2200 may be a terminal device such as a computer, a mobile phone, digital broadcast terminal, a message transceiver, a game console, a tablet device, a medical device, a fitness device and a personal digital assistant and so on.

As shown in FIG. 22, the apparatus 2200 may include one or more of a processing component 2201, a memory 2202, a power supply component 2203, a multimedia component 2204, an audio component 2205, an input/output interface 2206, a sensor component 2207 and a communication component 2208.

The processing component 2201 generally controls overall operations of the apparatus 2200, such as operations associated with display, phone calls, data communications, camera operations, and recording operations. The processing component 2201 may include one or more processors 2209 to execute instructions to complete all or part of the steps of the above methods. In addition, the processing component 2201 may include one or more modules which facilitate the interaction between the processing component 2201 and other components. For example, the processing component 2201 may include a multimedia module to facilitate the interaction between the multimedia component 2204 and the processing component 2201.

The memory 2202 is configured to store various types of data to support the operation of the apparatus 2200. Examples of such data include instructions for any application or method operated on the apparatus 2200, contact data, phonebook data, messages, pictures, videos, and so on. The memory 2202 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2203 supplies power for different components of the apparatus 2200. The power supply component 2203 may include a power supply management system, one or more power supplies, and other components associated with generating, managing and distributing power for the apparatus 2200.

The multimedia component 2204 includes a screen providing an output interface between the apparatus 2200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2204 may include a front camera and/or a rear camera. The front camera and/or rear camera may receive external multimedia data when the apparatus 2200 is in an operating mode, such as a photographing mode or a video mode. Each of the front camera and the rear camera may be a fixed optical lens system or have focal length and optical zooming capability.

The audio component 2205 is configured to output and/or input an audio signal. For example, the audio component 2205 includes a microphone (MIC). When the apparatus 2200 is in an operating mode, such as a call mode, a record mode and a voice recognition mode, the microphone is configured to receive an external audio signal. The received audio signal may be further stored in the memory 2202 or sent via the communication component 2208. In some examples, the audio component 2205 further includes a speaker for outputting an audio signal.

The I/O interface 2206 provides an interface between the processing component 2201 and a peripheral interface module. The above peripheral interface module may be a keyboard, a click wheel, buttons, or the like. These buttons may include but not limited to, a home button, a volume button, a start button and a lock button.

The sensor component 2207 includes one or more sensors to provide status assessments of various aspects for the apparatus 2200. For example, the sensor component 2207 may detect the on/off status of the apparatus 2200, and relative positioning of component, for example, the component is a display and a keypad of the apparatus 2200. The sensor component 2207 may also detect a change in position of the apparatus 2200 or a component of the apparatus 2200, a presence or absence of the contact between a user and the apparatus 2200, an orientation or an acceleration/deceleration of the apparatus 2200, and a change in temperature of the apparatus 2200. The sensor component 2207 may include a proximity sensor to detect the presence of a nearby object without any physical contact. The sensor component 2207 may further include an optical sensor, such as a Complementary Metal-Oxide-Semiconductor (CMOS) or Charged Coupled Device (CCD) image sensor which is used in imaging applications. In some examples, the sensor component 2207 may further include an acceleration sensor, a gyroscope sensor, a magnetic sensor, a pressure sensor, or a temperature sensor.

The communication component 2208 is configured to facilitate wired or wireless communication between the apparatus 2200 and other devices. The apparatus 2200 may access a wireless network based on a communication standard, such as Wi-Fi, 2G or 3G, or a combination thereof. In an example, the communication component 2208 receives a broadcast signal or broadcast related information from an external broadcast management system via a broadcast channel. In an example, the communication component 2208 may further include a Near Field Communication (NFC) module for promoting short-range communication. For example, the NFC module may be implemented based on a radio frequency identification (RFID) technology, an infrared data association (IrDA) technology, an ultra-wide-band (UWB) technology, a Bluetooth® (BT) technology and other technologies.

In an example, the apparatus 2200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 2202 including instructions. The above instructions may be executed by the processor 2209 of the apparatus 2200 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

Wherein when instructions in the storage medium are executed by the processor the apparatus 2200 is enabled to perform the method for self-interference processing according to any one of above examples.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for self-interference processing, applied to a base station, and comprising:
   determining that a terminal has a self-interference processing capability, wherein the self-interference processing capability is achieved through an autonomous denial functionality;
   configuring a first autonomous denial parameter for achieving the self-interference processing capability for the terminal;
   sending the first autonomous denial parameter to the terminal, so that the terminal performs a corresponding self-interference processing according to the first autonomous denial parameter;
   receiving a second autonomous denial parameter sent by the terminal, wherein the second autonomous denial parameter is a parameter for achieving the self-interference processing capability recommended by the terminal;

in response to choosing, according to the second autonomous denial parameter, to adjust the first autonomous denial parameter, obtaining an adjusted third autonomous denial parameter by adjusting the first autonomous denial parameter according to the second autonomous denial parameter; and sending the third autonomous denial parameter to the terminal, so that the terminal stops performing the self-interference processing according to the first autonomous denial parameter, but performs the self-interference processing according to the third autonomous denial parameter.

2. The method according to claim 1, wherein determining that the terminal has the self-interference processing capability comprises:

receiving radio access capability report information sent by the terminal, wherein the radio access capability report information comprises first information for indicating that the terminal has the self-interference processing capability; and determining that the terminal has the self-interference processing capability, according to the first information.

3. The method according to claim 2, wherein receiving the radio access capability report information sent by the terminal comprises:

receiving a transmitted first radio resource control (RRC) signaling, wherein the first RRC signaling comprises the radio access capability report information; and acquiring the radio access capability report information from the first RRC signaling.

4. The method according to claim 1, wherein the first autonomous denial parameter comprises at least one of following parameters:

a number of subframes designated for autonomous denial;
time designated for autonomous denial; or
a carrier designated for autonomous denial.

5. The method according to claim 1, wherein sending the first autonomous denial parameter to the terminal comprises:

adding the first autonomous denial parameter to a second RRC signaling; and sending the second RRC signaling to the terminal, so that the terminal acquires the first autonomous denial parameter from the second RRC signaling.

6. The method according to claim 1, wherein the third autonomous denial parameter is the same as the second autonomous denial parameter; or the third autonomous denial parameter is different from the first autonomous denial parameter and the second autonomous denial parameters.

7. The method according to claim 1, further comprising:

in response to choosing, according to the second autonomous denial parameter, not to adjust the first autonomous denial parameter, generating a specific notification signaling, wherein the specific notification signaling is configured to indicate in an explicit way that the base station chooses not to adjust the first autonomous denial parameter; and sending the specific notification signaling to the terminal, so that the terminal determines that the base station chooses not to adjust the first autonomous denial parameter, according to the specific notification signaling.

8. A method for self-interference processing, applied to a terminal, and comprising:

receiving a first autonomous denial parameter sent by a base station, wherein the first autonomous denial parameter is a parameter for achieving a self-interference processing capability of the terminal, which is configured by the base station for the terminal after the base station determines that the terminal has the self-interference processing capability achieved through an autonomous denial functionality;

performing the self-interference processing according to the first autonomous denial parameter;

determining a second autonomous denial parameter, wherein the second autonomous denial parameter is a parameter for achieving the self-interference processing capability recommended by the terminal;

sending the second autonomous denial parameter to the base station, so that the base station chooses, according to the second autonomous denial parameter, to adjust the first autonomous denial parameter or not to adjust the first autonomous denial parameter; and in response to receiving a third autonomous denial parameter sent by the base station, stopping performing the self-interference processing according to the first autonomous denial parameter, but performing the self-interference processing according to the third autonomous denial parameter, wherein the third autonomous denial parameter is an autonomous denial parameter obtained by adjusting the first autonomous denial parameter according to the second autonomous denial parameter by the base station.

9. The method according to claim 8, further comprising:

in response to determining that the terminal has the self-interference processing capability, generating first information for indicating that the terminal has the self-interference processing capability;

adding the first information to radio access capability report information; and sending the radio access capability report information to the base station, so that the base station determines that the terminal has the self-interference processing capability according to the first information in the radio access capability report information.

10. The method according to claim 9, wherein sending the radio access capability report information to the base station comprises:

adding the radio access capability report information to a first radio resource control (RRC) signaling; and sending the first RRC signaling to the base station, so that the base station acquires the radio access capability report information from the first RRC signaling.

11. The method according to claim 8, wherein the first autonomous denial parameter comprises at least one of following parameters:

a number of subframes designated for autonomous denial;
time designated for autonomous denial; or
a carrier designated for autonomous denial.

12. The method according to claim 8, wherein receiving the first autonomous denial parameter sent by the base station comprises:

receiving a transmitted second RRC signaling, wherein the second RRC signaling comprises the first autonomous denial parameter; and acquiring the first autonomous denial parameter from the second RRC signaling.

13. The method according to claim 8, further comprising:
in response to receiving a specific notification signaling sent by the base station, wherein the specific notification signaling is configured to indicate in an explicit way that the base station chooses not to adjust the first autonomous denial parameter, continuing to perform the self-interference processing according to the first autonomous denial parameter.

14. The method according to claim 8, further comprising:
starting a specific timer; and
in response to not receiving the third autonomous denial parameter sent by the base station until the specified timer expires, determining that the base station chooses not to adjust the first autonomous denial parameter, and continuing the self-interference processing according to the first autonomous denial parameter.

15. An apparatus for self-interference processing, comprising:
at least one processor; and
a memory for storing instructions executable by the at least one processor;
wherein the at least one processor is configured to:
determine that a terminal has a self-interference processing capability, wherein the self-interference processing capability is achieved through an autonomous denial functionality;
configure a first autonomous denial parameter for achieving the self-interference processing capability for the terminal;
send the first autonomous denial parameter to the terminal, so that the terminal performs a corresponding self-interference processing according to the first autonomous denial parameter;
receive a second autonomous denial parameter sent by the terminal, wherein the second autonomous denial parameter is a parameter for achieving the self-interference processing capability recommended by the terminal;
in response to choosing, according to the second autonomous denial parameter, to adjust the first autonomous denial parameter, obtain an adjusted third autonomous denial parameter by adjusting the first autonomous denial parameter according to the second autonomous denial parameter; and
send the third autonomous denial parameter to the terminal, so that the terminal stops performing the self-interference processing according to the first autonomous denial parameter, but performs the self-interference processing according to the third autonomous denial parameter.

16. An apparatus for self-interference processing, comprising:
at least one processor; and
a memory for storing instructions executable by the at least one processor;
wherein the at least one processor is configured to perform the method according to claim 8.

\* \* \* \* \*